United States Patent
Luehrsen et al.

(10) Patent No.: US 10,006,349 B2
(45) Date of Patent: Jun. 26, 2018

(54) WASTEGATE CONTROL

(71) Applicant: Ford Global Technologies, LLC, Dearborn, MI (US)

(72) Inventors: Eric Luehrsen, Dearborn, MI (US); Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 14/298,799

(22) Filed: Jun. 6, 2014

(65) Prior Publication Data

US 2015/0354441 A1  Dec. 10, 2015

(51) Int. Cl.
*F02B 37/18* (2006.01)
*F02B 39/16* (2006.01)
*F02D 41/00* (2006.01)
*F02D 41/24* (2006.01)

(52) U.S. Cl.
CPC .......... *F02B 37/186* (2013.01); *F02B 37/18* (2013.01); *F02B 39/16* (2013.01); *F02D 41/0007* (2013.01); *F02D 41/2464* (2013.01); *F02D 2200/703* (2013.01); *F02D 2250/16* (2013.01); *Y02T 10/144* (2013.01)

(58) Field of Classification Search
CPC ........ F02B 37/186; F02B 37/18; F02B 39/16; F02D 41/2464; F02D 41/0007; F02D 2250/16; F02D 2200/703; Y02T 10/144
USPC ............................ 60/602, 612, 600; 123/399
See application file for complete search history.

(56) References Cited

U.S. PATENT DOCUMENTS

| | | | | |
|---|---|---|---|---|
| 7,305,828 B2* | 12/2007 | Todoroki | ................ | F02D 23/02 123/562 |
| 8,515,647 B2* | 8/2013 | Panciroli | ............. | F02D 41/0007 60/602 |
| 8,572,961 B2* | 11/2013 | Karnik | .................. | F02B 37/183 60/600 |
| 2005/0022762 A1* | 2/2005 | Machida | ............. | F01L 13/0063 123/90.17 |
| 2009/0108793 A1* | 4/2009 | Sanders | ............ | G05B 19/4062 318/610 |
| 2009/0265076 A1* | 10/2009 | Hirose | .................. | F02D 11/106 701/103 |
| 2013/0085658 A1* | 4/2013 | Miyake | ............... | F02D 41/2441 701/112 |
| 2013/0189072 A1 | 7/2013 | Wade | | |
| 2014/0341703 A1* | 11/2014 | Kokotovic | ............ | F02B 37/186 415/1 |

(Continued)

FOREIGN PATENT DOCUMENTS

DE  102012006532 A1  10/2013

OTHER PUBLICATIONS

Wang, Yan et al., "Determination of Wastegate Valve Position," U.S. Appl. No. 14/014,156, filed Aug. 29, 2013, 48 pages.

(Continued)

*Primary Examiner* — Jason T Newton
(74) *Attorney, Agent, or Firm* — Julia Voutyras; McCoy Russell LLP (57) ABSTRACT

Various methods for operating a wastegate are provided. In one example, a method of controlling a linked valve actuator system comprises adjusting the actuator near an end stop based on a learned uncertainty end stop region, the region based on operating conditions.

19 Claims, 6 Drawing Sheets

(56) References Cited

U.S. PATENT DOCUMENTS

2015/0240707 A1* 8/2015 Wang .................... F02B 37/16
60/602
2016/0108800 A1* 4/2016 Wang .................. F02D 41/1401
60/602

OTHER PUBLICATIONS

Wang, Yan et al., "Wastegate Valve Seat Position Determination," U.S. Appl. No. 14/189,836, filed Feb. 25, 2014, 44 pages.

* cited by examiner

WASTEGATE CONTROL

FIELD

The field of the disclosure relates to control of a wastegate in a turbocharger.

BACKGROUND AND SUMMARY

A variety of components in an internal combustion engine employ valves to control the flow of various fluids (e.g., pressurized air, fuel, lubricant, etc.). To increase the accuracy of valve positioning, and thus flow control, a valve may be actuated by a servomechanism that utilizes an electric motor and provides position feedback (e.g., via gearing). Valves employed in an internal combustion engine are frequently subjected to high temperatures and mechanical forces, both of which vary greatly throughout the course of engine operation. One example of such a valve is a wastegate valve whose position is varied to control an amount of exhaust gas reaching a turbine of a turbocharger. As the turbine may be mechanically coupled to a compressor configured to compress intake air, controlling exhaust flow via the wastegate valve facilitates control of the level of compression performed by the compressor, in turn controlling the boost pressure delivered to an associated engine. Wastegate valves are frequently subjected to high temperatures and mechanical forces due at least in part to the flow of proximate exhaust gas. Consequently, mechanical deformation in the wastegate may occur—for example, the length of a linkage coupling a wastegate actuator to the wastegate valve may increase due to thermal expansion. Despite the position feedback provided by employing a servomechanism to actuate the wastegate valve, valve positioning may become significantly inaccurate due to these thermal and mechanical factors. This may lead to inaccurate boost control, and in some examples, unintended collision of the wastegate valve with its end stop (e.g., valve seat) due to uncertainty in the location of the end stop, which can cause degraded wastegate operation.

German Pat. App. No. DE20121006532 describes a method of adapting wastegate valve positioning to thermal and mechanical factors that cause deformation in a wastegate. In particular, a fully closed position of the wastegate valve (i.e., the location of the valve end stop) is learned prior to engine startup and stored as a cold fully closed position. During subsequent engine operation, instances in which the wastegate valve is placed at the fully closed position are leveraged to learn the fully closed position during different thermal conditions—namely, at high temperatures. This fully closed position is stored as a hot fully closed position. The wastegate valve may then be positioned according to the fully closed positions learned for the cold and hot thermal conditions to thereby reduce inaccuracy introduced by thermal deformation.

The inventors herein have recognized an issue with the above approach. For many vehicles, opportunities that allow learning of the wastegate valve end stop following engine startup are rare. For some vehicles, such opportunities may be extremely limited even throughout their lifetimes. Moreover, commanded wastegate valve lifts that do not correspond to the end stop typically cannot be modified to correspond to the end stop to force an opportunity to learn the end stop—e.g., as surge may occur.

Methods for operating a wastegate are thus provided. In one example, a method of controlling a linked valve actuator system comprises adjusting the actuator near an end stop based on a learned uncertainty end stop region, the region based on operating conditions.

In a more specific example, adjusting the actuator includes gradually moving the valve toward the end stop upon reaching an edge of the learned uncertainty end stop region.

In another aspect of the example, the operating conditions include desired boost, the gradual movement of the valve limited such that the desired boost is not unacceptably overshot.

In yet another aspect of the example, the operating conditions include a surge condition, the gradual movement of the valve limited according to the surge condition such that turbocharger compressor surge does not occur.

In still another aspect of the example, the learned uncertainty end stop region is based on one or more previously learned uncertainty end stop regions.

In still further another aspect of the example, a magnitude of the learned uncertainty end stop region is reduced as a number of previously learned uncertainty end stop regions increases.

In the examples described above, wastegate valve positioning may account for thermal and mechanical factors that alter the location of an end stop of the wastegate valve. Collisions between the valve and the end stop that may degrade wastegate valve operation may be avoided. Moreover, conducive operating conditions may be leveraged to reduce uncertainty in the location of the end stop. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Internal combustion engines utilize a plurality of valves to control the flow of various fluids, including but not limited to intake air, exhaust, fuel, lubricant, etc. Increasingly, engine valves are being actuated via servomechanisms to increase the accuracy of valve positioning and thus flow control. Such servomechanisms may employ electric motors and provide position feedback via gearing, for example. Despite the increased positioning accuracy afforded by the user of servomechanisms, high surrounding temperatures and mechanical forces frequently introduce uncertainty to valve positioning. For example, a wastegate valve used to regulate the amount of exhaust gas reaching a turbocharger turbine, and in turn regulate the amount of boost pressure delivered to an engine, is frequently subjected to high temperatures and forces that mechanically deform portions of the turbocharger assembly. This mechanical deformation often changes the expected location of an end stop (e.g., valve seat) with which the valve makes contact when placed at its fully closed position. As such, the true location of the end stop may be unknown, which can lead to inaccurate boost control and inadvertent collisions with the end stop that degrade wastegate operation. While in some approaches true end stop locations are learned throughout engine operation, the opportunities to do so are frequently limited, for example by engine operating conditions; for some vehicles, such opportunities are extremely limited even throughout their lifetime.

Figure 1:
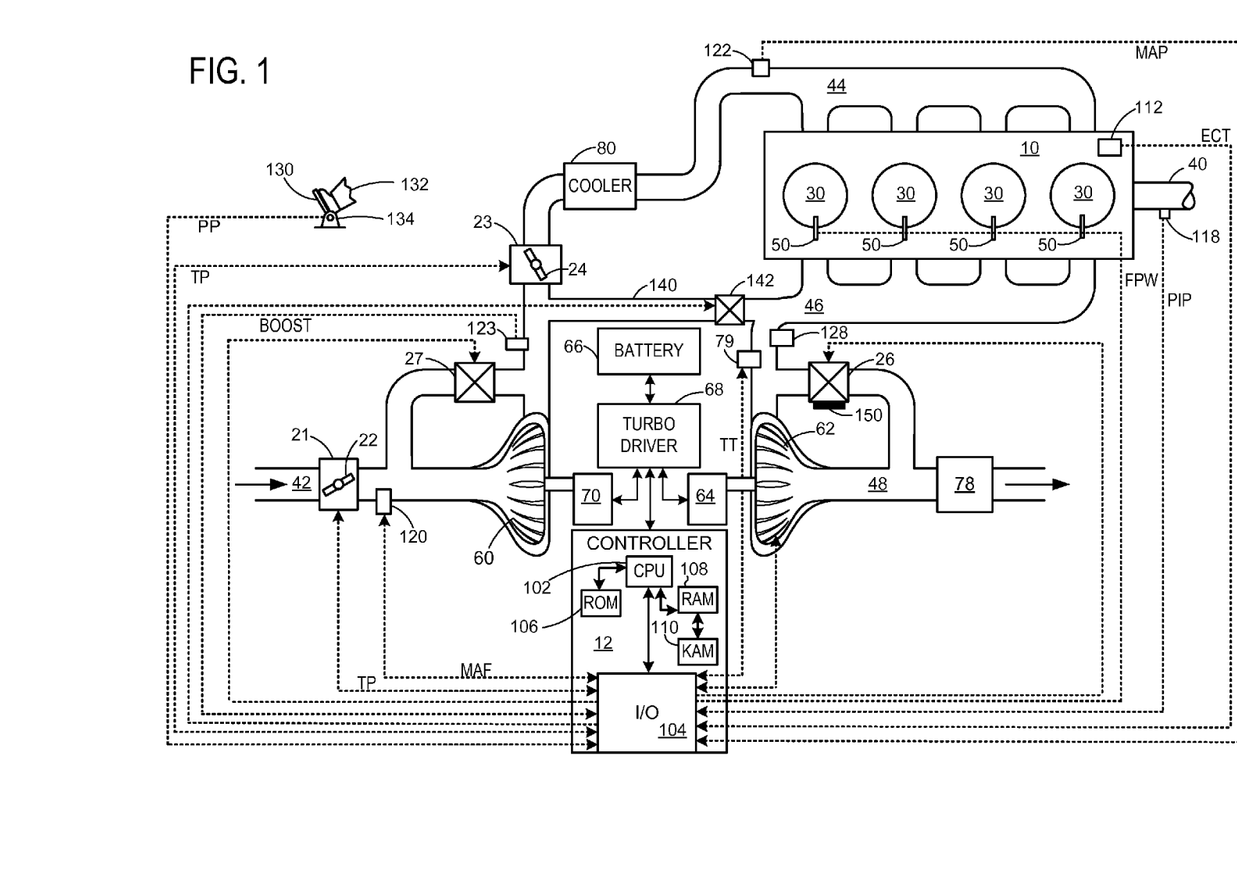
FIG. 1 shows a block diagram of a turbocharged engine including a wastegate.
Figure 2:
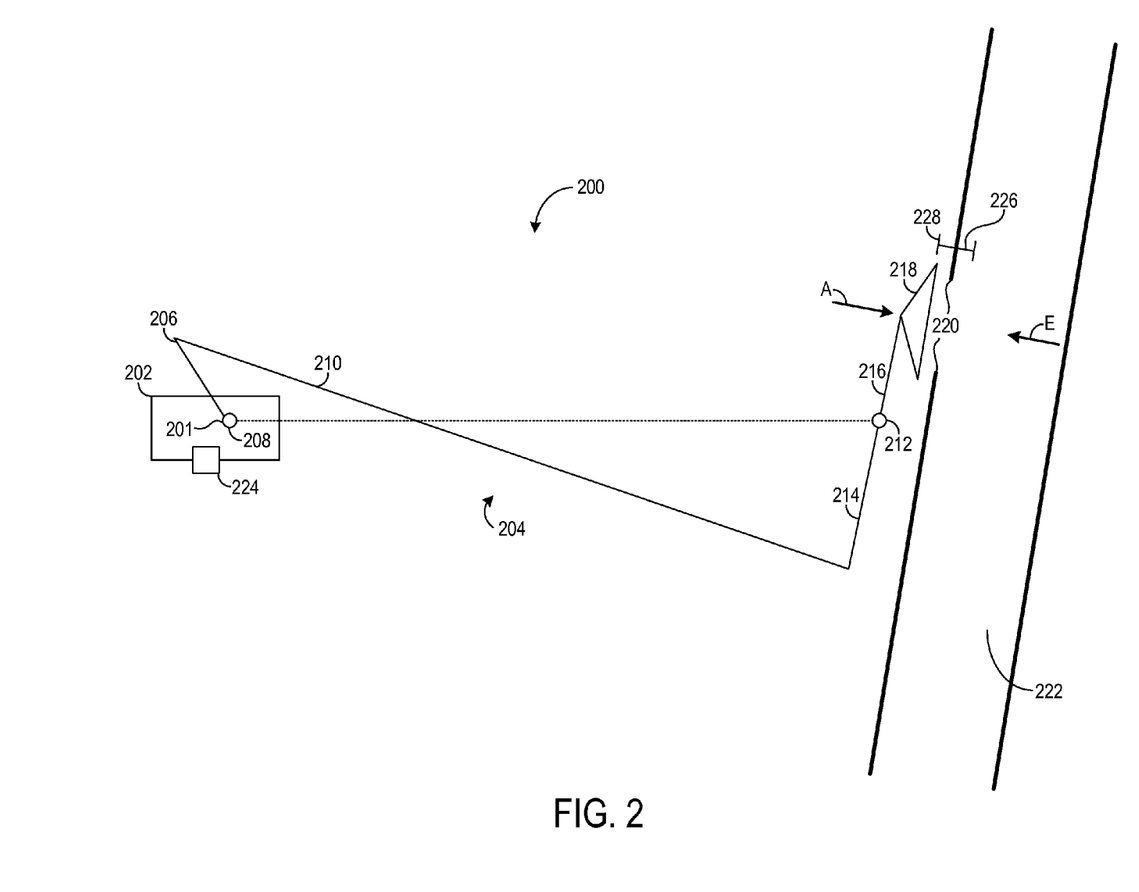
FIG. 2 shows an exemplary arrangement of the wastegate of FIG. 1.
Figure 4:
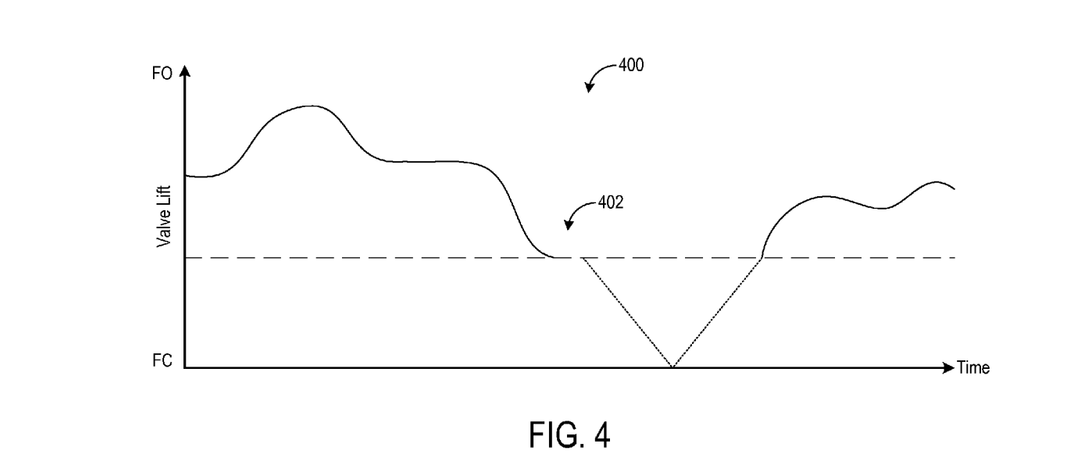
FIG. 4 shows an exemplary map illustrating the lift of a wastegate valve for an exemplary drive cycle.
Figure 5:
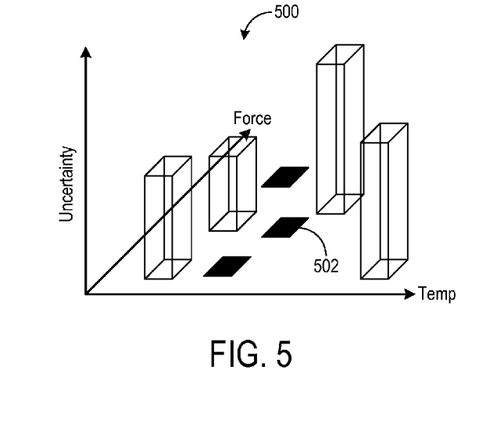
FIG. 5 shows an exemplary map illustrating how learned uncertainty regions may be stored for subsequent retrieval and associated with various operating conditions.
Figure 6:
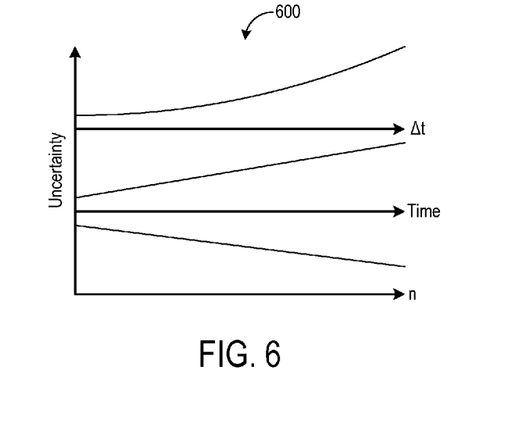
FIG. 6 shows a map illustrating exemplary dependence of the magnitude of an uncertainty region undergoing determination on various operating parameters.

Various methods for operating a wastegate are thus provided. FIG. 1 shows a block diagram of a turbocharged engine including a wastegate, FIG. 2 shows an exemplary arrangement of the wastegate of FIG. 1, FIGS. 3A-C shows a flowchart illustrating a method of operating a wastegate, FIG. 4 shows an exemplary map illustrating the lift of a wastegate valve for an exemplary drive cycle, FIG. 5 shows an exemplary map illustrating how learned uncertainty regions may be stored for subsequent retrieval and associated with various operating conditions, and FIG. 6 shows a map illustrating exemplary dependence of the magnitude of an uncertainty region undergoing determination on various operating parameters. The engine of FIG. 1 also includes a controller configured to carry out the method depicted in FIGS. 3A-C.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In some examples, actuator 202 may be a servomechanism including an electric motor. In some examples, actuator 202 may particularly be a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust passage 48 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be particularly controlled via actuation of actuator 202 and placement of its output shaft 201, movements of which may be translated to the exhaust valve via linkage 204.

As shown, wastegate 200 further includes a position sensor 224 that may be configured to measure changes in the angle of output shaft 201 to thereby estimate the location of wastegate valve 218. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. For embodiments in which actuator 202 is a servomechanism, position sensor 224 may be a position feedback mechanism internal to the servomechanism, for example. In any case, a measurement by position sensor 224 may be used to determine the position of wastegate valve 218, particularly the distance from the top surface of valve seat 220 to the bottom surface of wastegate valve 218. In other embodiments, however, the position of wastegate valve 218 may be determined based on a soft model using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance (e.g., winding resistance), if these two quantities are known or can be measured or inferred. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

As described above, high temperatures and mechanical forces in and around wastegate 200 may cause physical deformation in various components of the wastegate. For example, hot exhaust gas flowing through exhaust passage 222 may cause thermal expansion in one or more of the passage, valve seat 220, wastegate valve 218, and linkage 204. Thermal contraction may also occur as temperatures in wastegate 200 fall from relatively higher temperatures to relatively lower temperatures. Thermal expansion and contraction particularly occurring in linkage 204 may reduce the accuracy of positioning of wastegate valve 218, as the output from wastegate actuator 202 will produce different valve lifts as the physical dimensions of the linkage vary with changing thermal conditions. Thermal expansion in linkage 204, for example, may cause wastegate valve 218 to reach valve seat 220 earlier than expected, which can result in collisions with the valve seat that degrade wastegate operation. Similarly, thermal expansion and contraction in valve seat 220 itself may introduce inaccuracy in positioning of wastegate valve 218, as the location of the valve seat may change relative to the wastegate valve. Thermal expansion in valve seat 220, for example, may bring the seat relatively closer to wastegate valve 218, increasing the chance of unintended valve collision with the seat.

Physical deformation in linkage 204, valve seat 220, and/or other components of wastegate 200 may occur for other reasons. At high loads (e.g., mechanical loads on wastegate valve 218), for example, high exhaust pressures due to exhaust gas travelling through exhaust passage 222 act against the bottom surface of wastegate valve 218 in a direction substantially aligned to a direction E. To compensate for such exhaust forces, and to position wastegate valve 218 at a position responsive to desired boost levels, an approximately equal and opposite actuator force is transmitted to the top of the wastegate valve at the point at which fourth link 216 is joined thereto, through linkage 204 from actuator 202, the force shown in FIG. 2 as being aligned to a direction A. Being responsive to the high exhaust pressures and resulting significant exhaust forces, the actuator force may cause variation (e.g., expansion, contraction in length, bending, etc.) in the geometry of linkage 204, which may be referred to herein as "deflection" or "deformation".

Physical deformation resulting from the thermal and mechanical factors described above generally reduce the accuracy of positioning of wastegate valve 218, and may specifically make the actual location of valve seat 220 unknown to a certain level of uncertainty. As such, it may be desired to quantify and reduce this level of uncertainty to the extent possible, and particularly to avoid collisions with valve seat 220 that can potentially degrade wastegate operation. Accordingly, methods described herein may be employed to control positioning of wastegate valve 218 in terms of the degree to which the location of valve seat 220 is uncertain. FIG. 2 shows an exemplary uncertainty region 226, which in this example is a range of distances in which the location of valve seat 220 is considered to reside. Uncertainty region 226 arose due to the thermal and/or mechanical factors described above, and has a magnitude that may be determined based on predetermined parameters and/or prior movement of wastegate valve 218 (e.g., previously learned locations of valve seat 220, previous encroachments into current or prior uncertainty regions, etc.). As described in further detail below, the magnitude and location within the possible range of lifts that may be assumed by wastegate valve 218 (e.g., lifts from the fully open position to the fully closed position) of uncertainty region 226 may be determined based on one or more previously learned positions of valve seat 220. Valve seat positions may be measured when operating conditions allow contact of wastegate valve 218 with valve seat 220, and may be stored in a suitable storage medium (e.g., ROM 106 of FIG. 1) in a suitable data structure (e.g., lookup table, database, etc.) such that they may be subsequently retrieved to inform uncertainty region determination. In some embodiments, commanded wastegate valve lifts that fall within uncertainty region 226 may be truncated to an edge of the uncertainty region that is farther away from valve seat 220 and closer to a fully open position—e.g., edge 228. In this way, inadvertent collision of wastegate valve 218 with valve seat 220 may be avoided.

As a consequence of lift command truncation, however, one or more operating parameters at least partially dependent on the position of wastegate valve 218 may fail to reach their desired values; for example, the boost pressure delivered to an engine (e.g., engine 10 of FIG. 1) may be undershot as a result of lift command truncation. To compensate, the position of wastegate valve 218, upon reaching edge 228, may be gradually moved toward its fully closed position and the true location of valve seat 220. Gradual advancement of wastegate valve 218 may include advancing the valve toward successively lower lifts at a reduced speed (e.g., 80% less) relative to that at which it is normally moved during non-gradual advancement, for example. The extent to which wastegate valve 218 may be advanced toward the fully closed position in uncertainty region 226 may be determined based on various operating conditions. In some scenarios, wastegate valve 218 may reach and make contact with valve seat 220, which may be detected by monitoring output from position sensor 224, for example. This may allow temporary elimination of uncertainty region 226 and measurement of the true position of valve seat 220. In other scenarios, wastegate valve 218 may advance within uncertainty region 226 but remain unable to make contact with valve seat 220. Although measurement of the true position of valve seat 220 cannot be performed in this example, the magnitude of uncertainty region 226 can be reduced, increasing the accuracy with which wastegate valve 218 may be positioned.

Figure 3A:
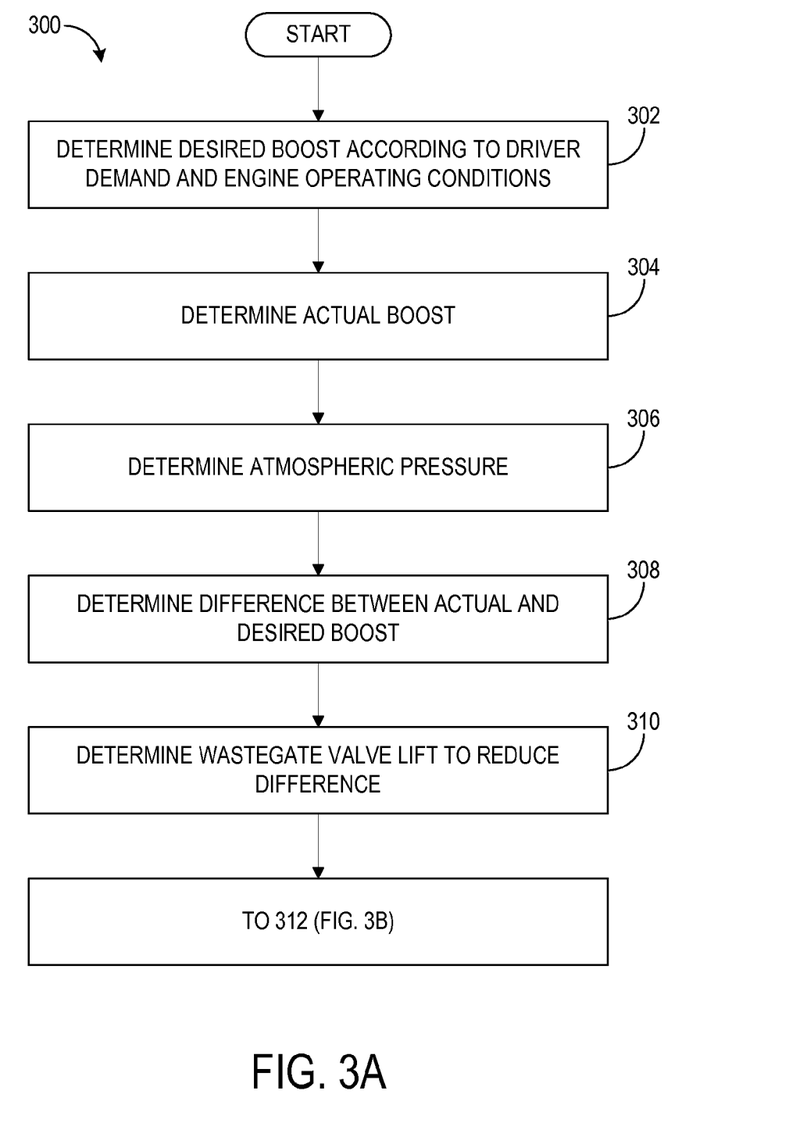
FIGS. 3A-C shows a flowchart illustrating a method of operating a wastegate.
Figure 3B:
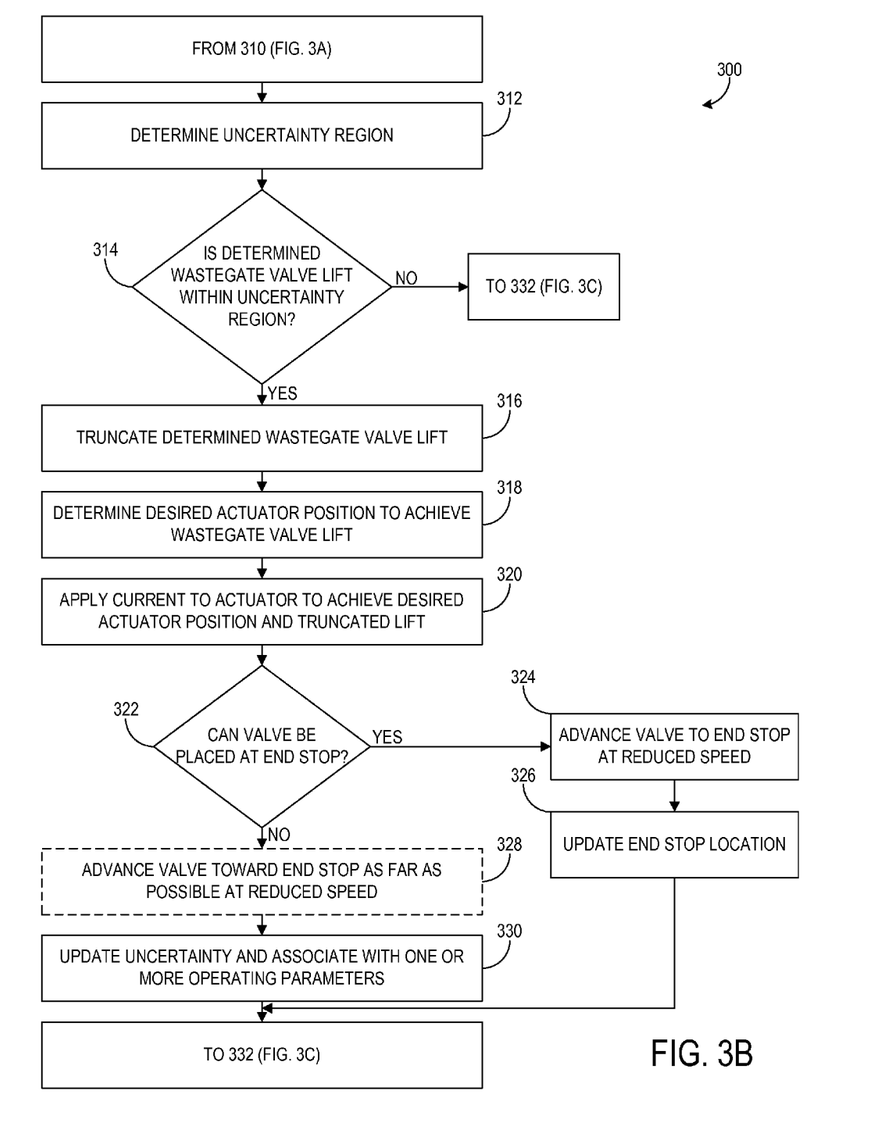
Figure 3C:
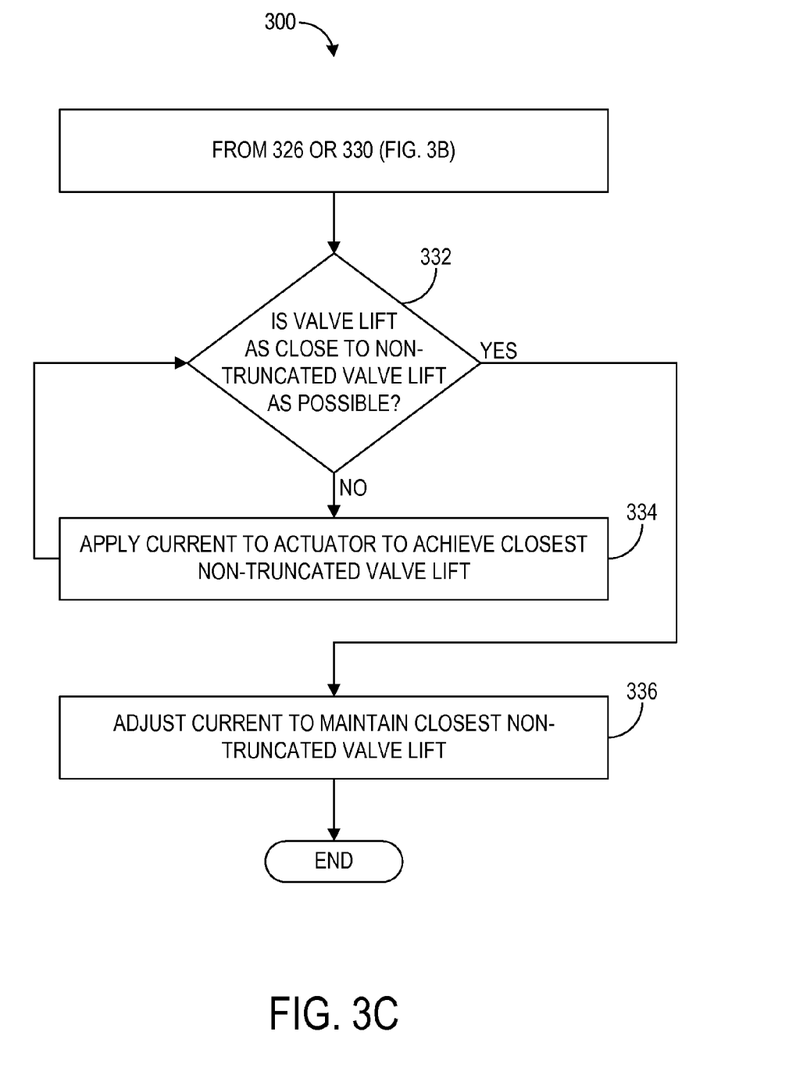

Turning now to FIGS. 3A-C, a flowchart illustrating a method 300 of operating a wastegate is shown. Method 300 may be employed to operate wastegate 200 of FIG. 2, for example, and may be stored on and/or executed by engine controller 12 of FIG. 1. In one example, a method of controlling a turbocharger via the wastegate may comprise determining a desired boost pressure and an actual boost pressure. The wastegate may be adjusted according to a difference between the desired boost pressure and the actual boost pressure.

At 302 the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 304, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as based on MAP and RPM, for example.

Next, at 306, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 308, a difference between the actual and desired boost is determined. The engine controller may determine the difference, for example. In some examples, the difference may be determined by subtracting the desired boost from the actual boost.

Next, at 310, a wastegate valve lift is determined in order to reduce the difference between the actual and desired boost determined at 308. In some examples, the difference between the actual and desired boost, in addition to the current wastegate valve lift, is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Turning now to FIG. 3B, method 300 continues to 312 where an uncertainty region is determined. As described above with reference to uncertainty region 226 of FIG. 2, the uncertainty region is a range of distances in which the location of an end stop (e.g., valve seat 220 of FIG. 2) with which the wastegate valve makes contact when at its fully closed position resides. The location of the end stop is uncertain, as the thermal and/or mechanical factors described above may have caused mechanical deformation in the wastegate assembly and altered the location of the end stop. Other factors may contribute to uncertainty in the location of the end stop, such as inherent uncertainty in position feedback provided by a wastegate valve position sensor. The magnitude and location of the uncertainty range in the range of possible lifts that may be assumed by the wastegate valve (e.g., lifts from the fully open to the fully closed position) may be determined based on a number of factors. In some examples, this determination may include retrieving one or more previously measured and stored end stop locations. In particular, the magnitude and/or location of the uncertainty range may be weighted by the time since the most recent end stop location was measured, such that the magnitude of the uncertainty range increases as the time since the most recent end stop location was measured increases. The magnitude and/or location of the uncertainty range may also be weighted based on the number of previously measured end stop locations—for example, the magnitude of the uncertainty range may be scaled down as the number of measured end stop locations increases. Determination of the uncertainty range may include evaluation of still other factors. In some embodiments, learned end stop locations may be associated with one or more instant operating parameters, including but not limited to temperature within or proximate the wastegate assembly and/or force acting against the wastegate assembly or portions thereof (which may be estimated based on exhaust flow, for example). In this way, the operating conditions associated with the previously learned end stop locations may be compared with their instant counterparts to inform uncertainty region determination. For example, a first previously learned end stop location associated with a temperature relatively closer to the instant temperature than that of a second previously learned end stop location may be weighted higher than the second previously learned end stop location.

Next, at 314, it is determined whether the wastegate valve lift determined at 310 falls within the uncertainty region determined at 312. As described in further detail below, valve lifts falling within the uncertainty region may be treated differently than those that do not fall within the uncertainty region to prevent valve collisions with the end stop that might degrade wastegate operation. If it is determined that the determined wastegate valve lift does not fall within the uncertainty region (NO), method 300 proceeds to 330. If it is instead determined that the determined wastegate valve lift falls within the uncertainty region (YES), method 300 proceeds to 316.

At 316, the determined wastegate valve lift is truncated. Truncation may include modifying a wastegate valve lift such that a relatively greater lift (e.g., greater separation from the valve to the end stop) is stipulated than would be stipulated if the wastegate valve lift was not modified. Thus, the extent to which the wastegate valve reaches the end stop is truncated. In some examples, the determined wastegate valve lift may be truncated to an edge of the uncertainty region toward the fully open position and away from the end stop (e.g., edge 228 of FIG. 2). This may prevent hard collisions between the wastegate valve and the end stop. In other examples, determined valve lifts may not be truncated to this edge, but to a distance beyond the edge closer to the fully open position, or to a distance beyond the edge closer to the fully closed position and inside the uncertainty region. As described above, determined valve lifts that fall within the uncertainty region may be truncated as determined at 314. Alternatively or additionally, determined valve lifts that fall within a threshold distance from a previously learned end stop position (or a suitable average of two or more previously learned end stop positions) may be truncated, even if they fall outside of the uncertainty region. Still further, a truncated valve lift may be optionally assessed to determine whether positioning the wastegate valve at the truncated lift would produce an adverse and/or unacceptable effect, such as unacceptably undershooting desired boost. Here, encroachment into the uncertainty region may be accepted to preserve desired engine and/or vehicle operation.

Next, at 318, a desired actuator position is determined to achieve the truncated wastegate valve lift. The desired actuator position may be fed as an input to various suitable control mechanisms including those described above. In some embodiments, a desired actuator orientation may be alternatively determined, such as the rotational orientation of a rotating component in the actuator.

Next, at 320, current is applied to the actuator to achieve the desired actuator position and the truncated wastegate valve lift. A suitable voltage-to-current conversion mechanism may convert a voltage generated by the engine controller to generate the current. Here, valve movement resulting from application of current to achieve the truncated valve lift may occur at a nominal speed that is relatively greater than a reduced speed at which the valve may be moved when in the uncertainty region to avoid hard collisions with the end stop.

Next, at 322, it is determined whether the wastegate valve can be placed at its end stop without causing unacceptable deviation from desired operating parameters. Opportunities in which the wastegate valve may be placed at lifts other than the lift determined at 310 that facilitate measurement of the true location of the end stop without causing unacceptable deviation from the desired operating parameters may thus be leveraged. A plurality of desired operating parameters and/or operating conditions may be assessed, including but not limited to desired and actual boost so that the desired boost is not unacceptably overshot (e.g., 5% or greater) due to deviation from the nominal valve lift, a surge condition identifying whether surge will occur due to such deviation (e.g., surge in compressor 60 of FIG. 1), and the valve lift determined at 310 (e.g., this valve lift itself may be deviated from up to a certain amount). If it is determined that the wastegate valve can be placed at its end stop without causing unacceptable deviation from desired operating parameters (YES), method 300 proceeds to 324. If it is instead determined that the wastegate valve cannot be placed at its end stop without causing unacceptable deviation from desired operating parameters (NO), method 300 proceeds to 328.

At 324, the wastegate valve is advanced toward the end stop at a reduced speed. The wastegate valve may be advanced until contact with the end stop is achieved, which may be reflected by the change in output from the wastegate valve position sensor falling below a threshold. In some examples, detection of end stop contact may be followed by an increase in the force applied by the wastegate actuator to the wastegate valve, which may ensure end stop contact and provide an estimate of deflection in the wastegate linkage should any be present. As described above, the reduced speed may be a reduced speed relative to a nominal speed at which the wastegate valve is moved when not inside the uncertainty region (e.g., 80% less than the nominal speed). Gradual wastegate valve movement in this manner may allow hard collisions with the end stop to be avoided as well as changes to engine and/or vehicle operation that would be disturbing to a vehicle operator. Valve advancement toward the end stop allows the magnitude of the uncertainty region to be reduced to zero and the end stop location to be measured.

Next, at 326, the end stop location is updated upon reaching the end stop as a result of wastegate valve advancement. As described in further detail below, updating the end stop location may include associating the newly learned end stop location with one or more operating parameters (e.g., instant temperature inside or proximate the wastegate, force acting within or against the wastegate, time at which the end stop location is learned, etc.) and storing the location and its associated operating parameter(s) in a suitable data structure—for example, a lookup table or map stored in ROM 106 of FIG. 1. In this way, subsequent wastegate valve positioning may be informed by retrieving one or more previously learned end stop locations, particularly by allowing the instant end stop location to be estimated and changes thereto due to thermal and/or mechanical factors at least partially compensated via a comparison of one or more instant operating parameters to those associated with the previously learned end stop location(s).

At 328, if it was determined that the wastegate valve could not be placed at its end stop without causing unacceptable deviation from desired operating parameters as determined at 322, the wastegate valve may be optionally advanced toward the end stop as far as possible at the reduced speed. In other words, the wastegate valve lift is reduced to the extent possible allowed by operating conditions. Valve advancement toward the end stop allows the magnitude of the uncertainty region to be reduced, increasing the accuracy of subsequent wastegate valve positioning. As described above, the valve may be moved in a relatively gradual manner so that hard collisions with the end stop are avoided as well as changes to engine and/or vehicle operation that would be disturbing to a vehicle operator. Valve advancement facilitates at least partial compensation of undershooting (or other deviation from) one or more desired operating parameters resulting from valve lift truncation. Conversely, valve advancement may be limited so that the one or more desired operating parameters are not unacceptably overshot but acceptably satisfied. The valve may thus be gradually advanced toward successively lower lifts as long as the one or more desired operating parameters are not unacceptably overshot. A plurality of operating conditions may be assessed during valve advancement, including but not limited to desired and actual boost so that the desired boost is not unacceptably overshot (e.g., 5% or greater) due to valve advancement, a surge condition identifying whether surge will occur during valve advancement (e.g., surge in compressor 60 of FIG. 1), and the non-truncated valve lift (e.g., the valve lift determined at 310). In some examples, however, the wastegate valve may not be advanced toward the end stop and instead maintained at the truncated valve lift as determined at 316 (e.g., at the edge of the uncertainty region).

Next, at 330, the uncertainty region is updated based on the optional valve advancement performed at 326. In particular, the magnitude of the uncertainty region may be scaled down as a result of valve advancement. In some examples, the magnitude may be scaled down in proportion to the amount of valve advancement. The location of the uncertainty region in the range of possible wastegate valve lifts may also be updated according to valve advancement. The updated uncertainty region may then be associated with one or more operating parameters and stored in a suitable storage medium so that the updated uncertainty region may be retrieved during subsequent engine operation. Association with the one or more operating parameters allows subsequent determination of a new uncertainty region to determine the relevance of prior stored uncertainty regions. For example, the one or more operating parameters may include the time at which the uncertainty region was updated, an operating temperature at the time of update (e.g., an estimated or measured engine temperature, wastegate temperature, etc.), an estimate or measurement of mechanical forces acting against or within the wastegate assembly (e.g., exhaust flow through an exhaust passage), etc. Determination of the new uncertainty region may compare the instant values of these operating parameters with those associated with one or more previous uncertainty regions to determine their relevance; for example, a prior uncertainty region may be considered less relevant as the difference between its associated temperature, mechanical forces, and time of update and their instant counterparts increases. Uncertainty regions may be stored in a suitable data structure (e.g., lookup table) so that these and potentially other operating parameters may be used as an index into the data structure, facilitating retrieval of prior uncertainty regions. As wastegate valve advancement may not have been performed at 328, updating the uncertainty region in this example may not include updating the magnitude and/or location of the uncertainty region but recording that valve advancement was not allowed and optionally associating one or more operating parameters with this event.

Turning to FIG. 3C, next, at 332, it is determined whether the valve lift is as close to the non-truncated valve lift (e.g., the valve lift determined at 310) as possible. The valve lift may be maintained at the position to which the valve was advanced at 328 and not advanced farther for scenarios in which the non-truncated valve lift is closer to the end stop than the position to which the valve was advanced. In some examples, the valve lift may be maintained at the truncated valve lift if valve advancement did not occur at 328 (e.g., due to the valve already being advanced toward the end stop as far as is possible without causing unacceptable deviation from desired operating parameters). In this way, unacceptable encroachment into the uncertainty region may be avoided. Conversely, the valve lift may be increased and the wastegate valve moved away from the end stop if the non-truncated valve lift is greater than the current valve lift. Thus, if it is determined at 332 that the valve lift is not as close to the non-truncated valve lift as possible (NO), method 300 proceeds to 334. If it is determined that the valve lift is as close to the non-truncated valve lift as possible (YES), method 300 proceeds to 336.

At 334, current is applied to the wastegate actuator to achieve a valve lift closest to the non-truncated valve lift, whether the wastegate valve position is to be maintained or moved away from the end stop. A suitable voltage-to-current conversion mechanism may convert a voltage generated by the engine controller to generate the current, for example.

Finally, at 336, the current applied to the actuator is adjusted to maintain the closest non-truncated valve lift and control the actuator position. The closest non-truncated valve lift may be maintained via feedback and/or feedforward control algorithms. For example, valve lift may be controlled via an inner control loop. Thus, the applied current is adjusted when the actuator position reaches a position corresponding to the closest non-truncated valve lift. Following, 336, method 300 ends.

Thus, as shown and described, method 300 may be employed to quantify the uncertainty in the location of an end stop of a valve and to adapt valve positioning responsive to the magnitude and location of the uncertainty region. Opportunities conducive to reducing the magnitude and narrowing the location of the uncertainty may be leveraged to increase the accuracy of valve positioning without unacceptably altering engine operation. Further, hard collisions that may degrade valve operation may be avoided. Generally, method 300 may be employed to account for the uncertainty of the end stop location due to thermal deformation and mechanical forces that alter the end stop location.

FIG. 4 shows an exemplary map 400 illustrating the lift of a wastegate valve (e.g., valve 218 of FIG. 2) for an exemplary drive cycle. The wastegate valve lift spans a range of positions between a fully open position (labeled "FO" in FIG. 4), and a fully closed position (labeled "FC" in FIG. 4), and are shown as a function of time. It will be appreciated that the range spanned by the wastegate valve lifts and the appearance of their variance are provided as examples and are not intended to be limiting in any way. As shown, the wastegate valve lift initially varies for a period of time, exhibiting an increase toward the fully open position followed by a decrease toward the fully closed position. As indicated at 402, the wastegate valve lift reaches the edge (e.g., edge 228 of FIG. 2) of an uncertainty region. The edge in this example is the edge of the uncertainty region closer to the fully open position and away from the valve end stop, and is represented in FIG. 4 via dashed lines. Upon reaching this edge, the wastegate valve lift is truncated to the edge according to method 300 of FIG. 3. After a period in which the valve settles at the edge, the valve is walked toward the end stop until achieving contact with the end stop, reducing the magnitude of the uncertainty region to zero. After achieving contact with the end stop, the valve is walked back to the closest non-truncated lift possible and away from the end stop. Both periods of walking are illustrated in FIG. 4 via fine dashed lines. Upon reaching the edge once more, nominal wastegate valve positioning resumes.

FIG. 5 shows an exemplary map 500 illustrating how learned uncertainty regions may be stored for subsequent retrieval and associated with various operating conditions. It will be appreciated that map 500 is one example of a suitable data structure in which uncertainty regions may be stored. Further, while uncertainty region magnitudes are shown, uncertainty region locations may be stored as well. Still further, learned uncertainty regions are shown as being associated with exhaust force and temperature, though additional, fewer, or other parameters may be associated with learned uncertainty regions. The variance of uncertainty region magnitudes with exhaust force and temperature are also exemplary. As shown, map 500 includes a plurality of uncertainty regions learned under different operating conditions (different exhaust forces and temperatures). When determining a new uncertainty region, one or more of the learned uncertainty regions may be retrieved from map 500 by supplying an instant temperature and/or exhaust force. As these parameters are associated with the learned uncertainty regions, their values may be compared to their instant counterparts to determine their relevance and weight their contribution to the new uncertainty region accordingly. FIG. 5 also shows how map 500 may include learned uncertainty regions that have no uncertainty (e.g., region 502); here, contact with the valve end stop was successfully obtained, allowing measurement of the end stop location. As such, regions 502 have zero uncertainty and may include their respective learned end stop locations for subsequent retrieval.

FIG. 6 shows a map 600 illustrating exemplary dependence of the magnitude of an uncertainty region undergoing determination on various operating parameters. It will be appreciated that the dependence of uncertainty magnitude on these operating parameters is exemplary and is not intended to be limiting. As shown, the magnitude of the currently determined uncertainty region increases (e.g., quadratically) as a function of Δt, which is the difference between the current operating temperature and the operating temperature at which a previous uncertainty region was determined. For examples in which two or more previously learned uncertainty regions are evaluated, a suitable average of their associated operating temperatures may be considered. The magnitude of the currently determined uncertainty region similarly increases (e.g., linearly) as a function of the time between the time at which the most recently learned uncertainty region was determined, and the time at which the current uncertainty region is being determined. Finally, the magnitude of the currently determined uncertainty region decreases (e.g., linearly) as a function of the number of previously learned uncertainty regions; as more uncertainty regions are learned, the magnitude of the currently determined uncertainty region may be reduced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a linked valve actuator system, comprising:
determining engine operating conditions; and
adjusting an actuator near an end stop corresponding to a fully closed wastegate position based on a learned uncertainty end stop region, the region based on the engine operating conditions,
wherein adjusting the actuator includes gradually moving a valve of the linked valve actuator system toward the end stop upon reaching an edge of the learned uncertainty end stop region and reducing a magnitude of the learned uncertainty end stop region based on the moving, and
wherein the linked valve actuator system comprises a servomechanism operatively coupled to a wastegate valve via a four-bar linkage.

2. The method of claim 1,
wherein the valve is moved toward the end stop upon reaching the edge while one or more desired operating parameters are satisfied; and
wherein, in response to the valve being moved to the end stop, the magnitude of the learned uncertainty end stop region is reduced to zero.

3. The method of claim 1, wherein the adjusting occurs during a boosted condition, and wherein the engine operating conditions include desired boost, the gradual movement of the valve limited such that the desired boost is not overshot by more than a threshold amount.

4. The method of claim 1, wherein the engine operating conditions include a surge condition, the gradual movement of the valve limited according to the surge condition such that turbocharger compressor surge does not occur.

5. The method of claim 1, wherein the learned uncertainty end stop region is based on one or more previously learned uncertainty end stop regions; and
wherein gradually moving the valve comprises moving the valve at a slower rate compared to a rate of moving the valve when not inside the learned uncertainty end stop region.

6. The method of claim 1, further comprising increasing the magnitude of the learned uncertainty end stop region as a difference between an operating temperature associated with the learned uncertainty end stop region and an operating temperature associated with a previously learned uncertainty end stop region increases.

7. The method of claim 1, further comprising increasing the magnitude of the learned uncertainty end stop region as a difference between a time at which the learned uncertainty end stop region was learned and a time at which a previously learned uncertainty end stop region was learned increases,
wherein the servomechanism comprises a rotary electric motor including an output shaft, the output shaft coupled to a first link of the four-bar linkage, wherein the servomechanism further comprises a rotary encoder configured to generate a signal representing a rotation of the rotary electric motor, wherein the four-bar linkage comprises a first pivot and a second pivot, wherein the first link and a second link are rotatable about the first pivot and a third link and a fourth link are rotatable about the second pivot, and wherein the wastegate valve is disposed in an exhaust stream of an engine.

8. A method of operating a wastegate comprising a wastegate valve, comprising:
determining engine operating conditions;

determining an uncertainty region in which a wastegate valve end stop is located, the end stop corresponding to a fully closed position of the wastegate;

determining a nominal wastegate valve lift based on the operating conditions; and responsive to the nominal wastegate valve lift falling into the uncertainty region, truncating the nominal wastegate valve lift to an edge of the uncertainty region;

walking the wastegate valve from the edge toward a fully closed position in the uncertainty region responsive to the operating conditions;

reducing a magnitude of the uncertainty region by an amount based on the walking; and returning the wastegate valve to the nominal wastegate valve lift.

9. The method of claim 8, wherein the wastegate valve is walked into the uncertainty region to a lift as close to the nominal wastegate valve lift as possible according to the operating conditions.

10. The method of claim 8, wherein the operating conditions include desired boost, the wastegate valve walking limited such that the desired boost is not overshot by more than a threshold amount.

11. The method of claim 8, wherein the operating conditions include a surge condition, the wastegate valve walking limited according to the surge condition such that turbocharger compressor surge does not occur.

12. The method of claim 8, further comprising measuring an end stop location of the wastegate valve if allowed by the operating conditions and, in response to measuring the end stop location, reducing the magnitude of the uncertainty region to zero, wherein walking the wastegate valve comprises moving the wastegate valve at a slower rate compared to a rate of moving the wastegate valve when not inside the uncertainty region.

13. The method of claim 8, wherein reducing the magnitude of the uncertainty region by an amount based on the walking comprises reducing the magnitude of the uncertainty region in proportion to a distance walked by the wastegate valve into the uncertainty region.

14. The method of claim 8, further comprising updating the uncertainty region based on one or more previously learned uncertainty regions, wherein updating the uncertainty region includes storing the uncertainty region associated with at least an exhaust temperature and an exhaust force.

15. The method of claim 14, wherein updating the uncertainty region based on the one or more previously learned uncertainty regions includes comparing a time at which the uncertainty region was learned to respective times at which the one or more previously learned uncertainty regions were learned.

16. A method of operating a wastegate of a boosted engine, comprising:

determining engine operating conditions; and during a boosted condition, positioning a wastegate valve to achieve desired boost;

adjusting the positioning in a region where a valve seat location is uncertain, and reducing a magnitude of the region by an amount based on the adjusting;

wherein the adjusting is limited such that the desired boost is not overshot by more than a threshold amount, wherein the adjusting comprises moving the wastegate toward a more fully closed position, and wherein, in response to the wastegate valve achieving contact with a valve seat, the magnitude is reduced to zero.

17. The method of claim 16, wherein adjusting the positioning includes gradually advancing the wastegate valve toward successively lower lifts upon reaching an edge of the region until achieving contact with the valve seat if advancement does not prevent one or more operating parameters from being acceptably satisfied.

18. The method of claim 17, wherein adjusting the positioning includes maintaining the wastegate valve at the edge of the region upon reaching the edge, and not advancing the wastegate valve toward successively lower lifts if advancement prevents one or more operating conditions from being acceptably satisfied.

19. The method of claim 18, wherein the adjusting is performed by a servomechanism operatively coupled to the wastegate valve via a four-bar linkage.

* * * * *